United States Patent
Ambapuram et al.

(10) Patent No.: US 9,619,014 B2
(45) Date of Patent: Apr. 11, 2017

(54) SUSPEND AND RESUME TIMELINE OPTIMIZATION FOR APPLICATION PROCESSOR

(71) Applicant: Qualcomm Innovation Center, Inc., San Diego, CA (US)

(72) Inventors: Sravan Kumar Ambapuram, Hyderabad (IN); Krishna V. S. S. S. R. Vanka, Hyderabad (IN); Murali Nalajala, Hyderabad (IN); Shirish Kumar Agarwal, Hyderabad (IN); Nikhil Kumar Kansal, Hyderabad (IN)

(73) Assignee: Qualcomm Innovation Center, Inc., San Diego, CA (US)

( * ) Notice: Subject to any disclaimer, the term of this patent is extended or adjusted under 35 U.S.C. 154(b) by 129 days.

(21) Appl. No.: 14/629,216

(22) Filed: Feb. 23, 2015

(65) Prior Publication Data
US 2016/0246348 A1    Aug. 25, 2016

(51) Int. Cl.
*G06F 1/00* (2006.01)
*G06F 1/32* (2006.01)
*G06F 9/445* (2006.01)
*G06F 9/48* (2006.01)
*G06F 9/44* (2006.01)

(52) U.S. Cl.
CPC .......... *G06F 1/329* (2013.01); *G06F 9/44526* (2013.01); *G06F 9/48* (2013.01); *G06F 9/4418* (2013.01)

(58) Field of Classification Search
CPC ..... G06F 1/3203; G06F 1/3206; G06F 9/4893
See application file for complete search history.

(56) References Cited

U.S. PATENT DOCUMENTS

| 5,902,352 | A  | * | 5/1999  | Chou     | G06F 9/4881  |
|           |    |   |         |          | 718/100      |
| 7,100,062 | B2 | * | 8/2006  | Nicholas | G06F 1/3228  |
|           |    |   |         |          | 713/300      |
| 8,453,002 | B2 | * | 5/2013  | Yoshida  | G06F 1/3203  |
|           |    |   |         |          | 710/260      |
| 9,032,229 | B2 | * | 5/2015  | Iwai     | G06F 1/3203  |
|           |    |   |         |          | 713/310      |
| 2003/0105983 | A1 | * | 6/2003 | Brakmo  | G06F 1/3203  |
|           |    |   |         |          | 713/320      |
| 2005/0010748 | A1 | * | 1/2005 | Osborn  | G06F 1/3209  |
|           |    |   |         |          | 713/1        |
| 2007/0283179 | A1 | * | 12/2007 | Burnett | H04N 5/63   |
|           |    |   |         |          | 713/324      |

(Continued)

*Primary Examiner* — Vincent Tran
(74) *Attorney, Agent, or Firm* — Neugeboren O'Dowd PC

(57) ABSTRACT

This disclosure describes systems, methods, and apparatus for reducing power consumption and improving performance on a computing device. A method includes scheduling, with a driver on the computing device, one or more activity times that indicate when the driver will be active and storing the one or more activity times that indicate when the driver will be active. When a request to suspend a system of the computing device is received, the stored activity times are accessed to identify when the driver will be active, and a determination is made whether any of the one or more activity times is scheduled to occur within a suspend time window. If the driver will not be active during the suspend time window, suspension of the system is initiated.

8 Claims, 6 Drawing Sheets

(56) References Cited

U.S. PATENT DOCUMENTS

| | | | |
|---|---|---|---|
| 2008/0098245 A1* | 4/2008 | Hogan | G06F 1/3287 |
| | | | 713/323 |
| 2008/0168285 A1* | 7/2008 | de Cesare | G06F 1/3203 |
| | | | 713/320 |
| 2012/0137155 A1* | 5/2012 | Yoshida | G06F 1/3203 |
| | | | 713/323 |
| 2013/0111242 A1* | 5/2013 | Heller | G06F 1/3206 |
| | | | 713/323 |
| 2016/0077575 A1* | 3/2016 | Paul | G06F 1/3237 |
| | | | 713/323 |

* cited by examiner

SUSPEND AND RESUME TIMELINE OPTIMIZATION FOR APPLICATION PROCESSOR

BACKGROUND

Field

The present disclosed embodiments relate generally to wireless mobile computing devices, and more specifically to power conservation in such devices.

Background

Mobile communication devices including devices such as smartphones, tablet computers, gaming devices, and laptop computers are now ubiquitous. A common and ongoing issue with these types of devices is power management. Although advances continue to be made in the areas of battery technology and hardware efficiency, current mobile device power management techniques are not adequate to meet user expectations and will almost certainly not be satisfactory in the future.

The application processor (or app processor) in many mobile wireless communication devices (or user equipment (UE)) may be suspended to conserve power. App processors are also starting to see multiple cores, thus allowing one or more cores to be idled or put into an offline state to save power. Moreover, a typical communication device has several hardware components and corresponding drivers that may be suspended during idle periods. These power saving techniques save power at the expense of processing power, an acceptable tradeoff when the app processor or other hardware components are not being fully utilized anyway.

A typical suspend and resume process includes suspending the application processor and/or other hardware if there are no pending wake locks and no wakeup source. When an interrupt is received, operation of the application processor or other hardware will be resumed. Problematically, control over suspending the application processor is based upon whether there is no wake lock or wakeup source pending. As a consequence, if there is an interrupt shortly after the suspend process is initiated, there will be additional undesirable latency to process it. Referring to FIG. 6, for example, shown is a timeline depicting this mode of operation in which a system takes X ms to complete a suspend process. As shown, if there is an interrupt after Y ms (where Y is less than X) the device takes an extra Zms to process the interrupt, which leads to poor performance (due to latencies) and suboptimal performance. Moreover, typical suspend and resume operations involve the entire system (e.g., user space, kernel drivers, and the app processor), which add substantial latency to both the suspend and resume processes.

SUMMARY OF THE DISCLOSURE

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

According to an aspect, a method includes managing power to components of a computing device. The method includes scheduling, with a driver on the computing device, one or more activity times that indicate when the driver will be active and storing the one or more activity times that indicate when the driver will be active. A request to suspend a system of the computing device is received, and the stored activity times are retrieved to identify when the driver will be active. A determination is then made whether any of the activity times is scheduled to occur within a suspend time window, and if the driver will not be active during the suspend time window, a suspension of the system will be initiated.

According to another aspect, a computing device is disclosed, which includes a plurality of hardware components to perform functions on the computing device and a plurality of drivers associated with the hardware components. The computing device also includes an interrupt scheduler to enable each of the drivers to schedule activity times that indicate when each of the drivers will be active. A suspend component operates to suspend operation of the hardware components, and a suspend management component is configured to obtain the activity times to identify when the drivers will be active and determine whether any of the activity times is scheduled to occur within a suspend time window. If the drivers will not be active during the suspend time window, the suspend component initiates suspension of the hardware components.

BRIEF DESCRIPTION OF THE DRAWINGS

Various objects and advantages and a more complete understanding of the present invention are apparent and more readily appreciated by referring to the following detailed description and to the appended claims when taken in conjunction with the accompanying drawings:

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
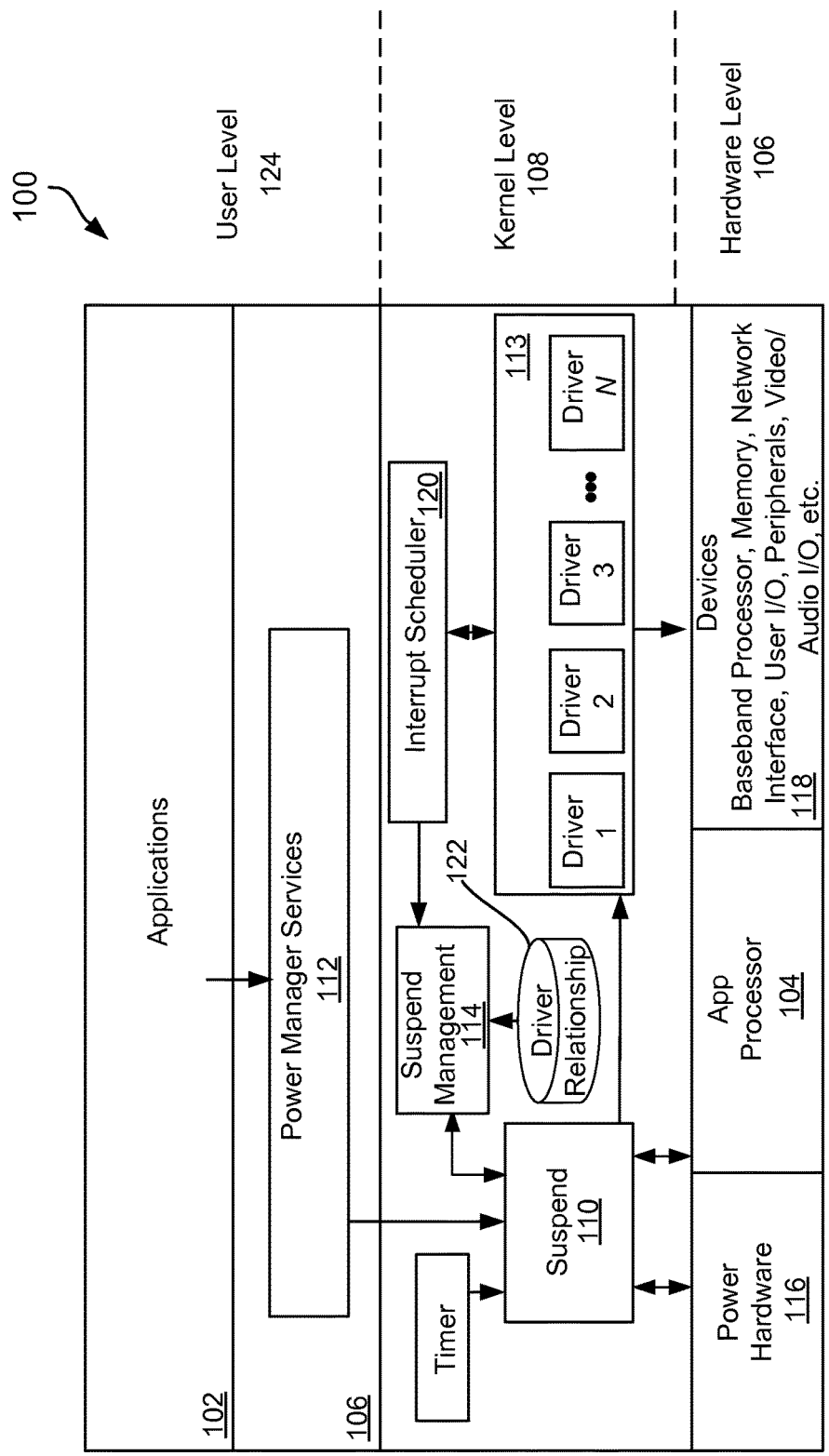
FIG. 1 illustrates a block diagram depicting components of a computing device.

Referring to FIG. 1, depicted is a computing device 100 that includes one or more applications 102 that are illustrated at the highest level of abstraction and hardware, such as the app processor 104, is illustrated at the lowest level—the hardware level 106. As shown, the computing device 100 includes a suspend component 110 that is in communication with power management services 112, a suspend management component 114, power hardware 116, and a collection of hardware devices 118. As shown, there are also N drivers 113 (also referred to as kernel drivers 113) at the kernel level 108 that are in communication with the hardware devices 118. In addition, in this embodiment is an interrupt scheduler 120 that is in communication with the suspend management component 114 and the hardware drivers 113. The suspend management component 114 is also in communication with a driver relationship datastore 122.

The depicted computing device 100 may be realized as a smartphone, personal or mobile multimedia player, personal data assistants (PDA's), laptop computers, tablet computers, ultrabooks, palm-top computers, wireless electronic mail receivers, multimedia Internet enabled cellular telephones, wireless gaming controllers, and similar personal electronic devices which include a programmable processor, a memory and circuitry for sending and/or receiving wireless communication signals via an open connection to a wireless network. While the various embodiments are particularly useful in mobile devices, such as cellular telephones, which have limited battery life, the embodiments are generally useful in any computing device that establishes communication sessions with a wireless telecommunication network.

The various embodiments presented throughout this disclosure may be implemented across a broad variety of telecommunication systems, network architectures, and communication standards. Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems. Generally, a wireless multiple-access communication system may simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Although not required, the depicted kernel level 108 may be implemented utilizing the LINUX kernel and/or by modifying the LINUX kernel to include the novel functionality described herein. In addition, the user level framework 124 may be implemented utilizing the ANDROID framework, but on alternative implementations, other types of framework systems may be utilized. As one of ordinary skill in the art will appreciate, the user level framework 124 and kernel level 108 components depicted in FIG. 1 may be realized by computer code stored in a non-transitory tangible computer readable medium such as nonvolatile memory, and can be executed by app processor 104.

The one or more applications 102 may be realized by a variety of applications that operate via or run on the app processor 104. For example, the one or more applications 102 may include a web browser and associated plug-ins, entertainment applications (e.g., video games, video players), productivity applications (e.g., word processing, spreadsheet, publishing applications, video editing, photo editing applications), core applications (e.g., phone, contacts), and augmented reality applications.

As shown, the applications 102 are in communication with the power manager services 112, which may be implemented on top of the kernel level 108. In this embodiment, the power manager services 112 functions to prompt the suspend component 110 to suspend the app processor and/or hardware components if those resources are not required; thus saving power. The applications 102 and other services (not shown) request hardware resources using "wake locks" through the power management services 112.

As one of ordinary skill appreciates, the drivers 113 generally enable the depicted constructs at the user level 124 and kernel level 108 to communicate with the components at the hardware level 106. For example, the drivers 113 are utilized to suspend and resume operation of the hardware devices 118. The interrupt scheduler 120 enables each of the drivers 113 to schedule activity times when hardware devices 118 will be active and schedule idles times when the hardware devices 118 will be idle. The drivers 113 may include camera drivers, display drivers, USB drivers, keypad drivers, Bluetooth drivers, WIFI drivers, flash memory drivers, audio drivers, binder (IPC) drivers, and power management drivers, to name a few.

The depicted suspend management component 114 is a novel component that generally enables the suspend component 110 to receive information from the interrupt scheduler 120, which enables the suspend component 110 to suspend and resume operations of the app processor 104 and hardware devices 118 based upon the particular interrupts that the drivers 113 scheduled with the interrupt scheduler 120. Additionally, the driver relationship datastore 122 includes data that relates the operations of the drivers 113. For example, the driver relationship datastore may include mappings between specific interrupts and the drivers 113 that are associated with those interrupts. In this way, the suspend component may resume particular ones of the drivers 113 (and hence the associated hardware devices 118) that are associated with particular interrupts; thus tailoring the drivers 113 that are resumed to the particular interrupt that is received.

Figure 2:
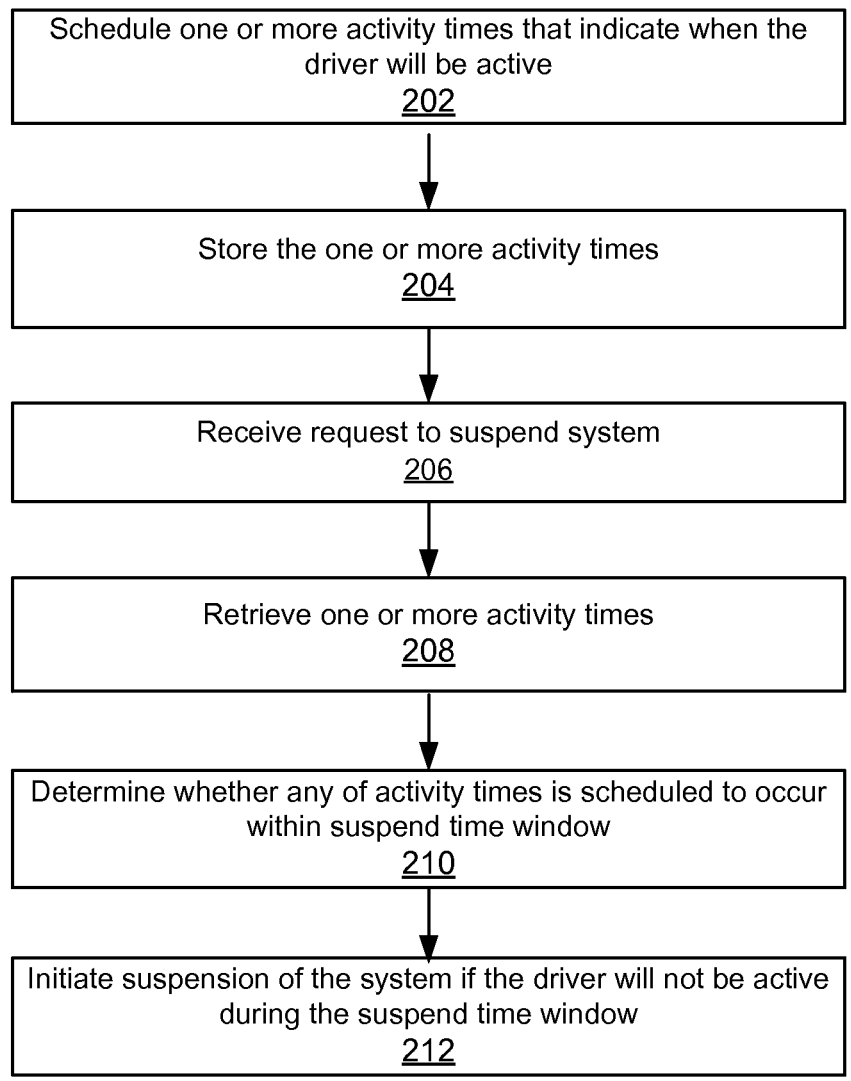
FIG. 2 is a flowchart depicting a method that may be traversed in connection with the embodiment depicted in FIG. 1.
Figure 6:
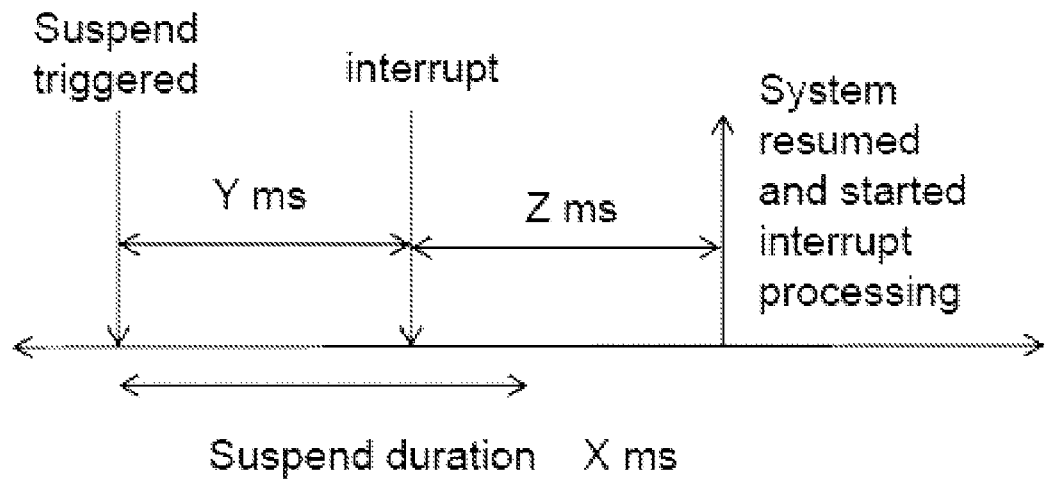
FIG. 6 is a diagram depicting timing aspects associated with prior art.

While referring to FIG. 1 simultaneous reference is made to FIG. 2, which is a method for managing power on the computing device 100. As shown, each of the drivers 113 may interact with the interrupt scheduler 120 to schedule one or more activity times that indicate when each of the drivers 113 will be active (Block 202), and the interrupt scheduler 120 stores the one or more activity times (Block 204). The suspend component 110 may receive a request from the idle timer requesting that the suspend component 110 initiate a suspension of the system (e.g., the user space, kernel, and application processor) of the computing device 100 (Block 206). In response, the suspend management component 114 retrieves the one or more activity times (Block 208), and determines whether any of the activity times are scheduled to occur within a suspend time window (Block 210). Referring briefly to FIG. 6, a suspend time window is depicted as a suspend duration of X milliseconds. Unlike prior art implementations, the suspend management component 114 allows the suspend component 110 to initiate suspension of the system if no drivers 113 will be active during the suspend time window; thus the undesirable latency described with reference to FIG. 6 is avoided.

Figure 3:
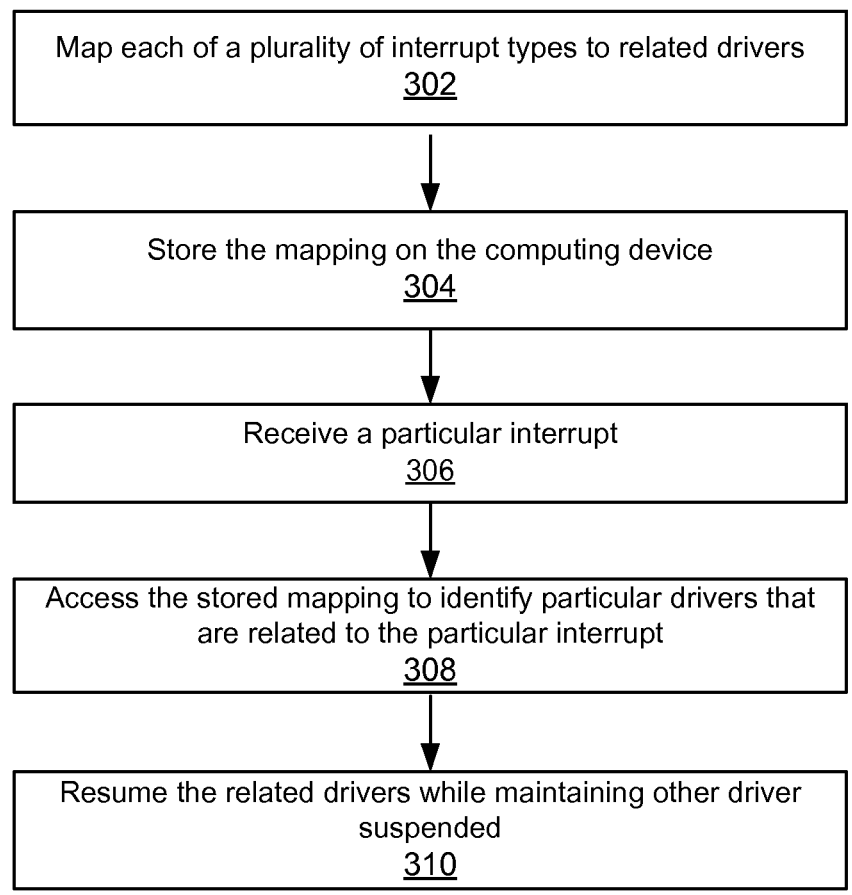
FIG. 3 is a flowchart depicting another method that may be traversed in connection with the embodiment depicted in FIG. 1.
Figure 4:
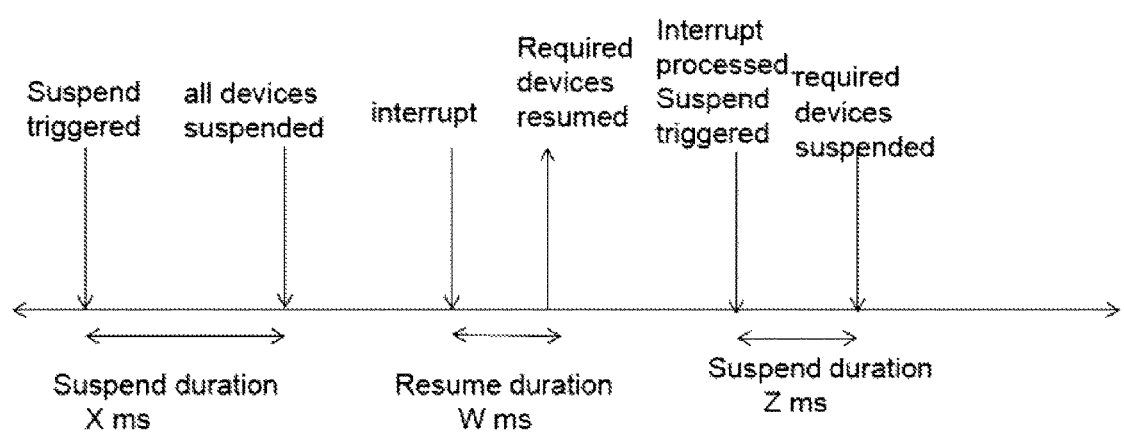
FIG. 4 is a diagram depicting timing aspects associated with the method depicted in FIG. 4.
Figure 7:
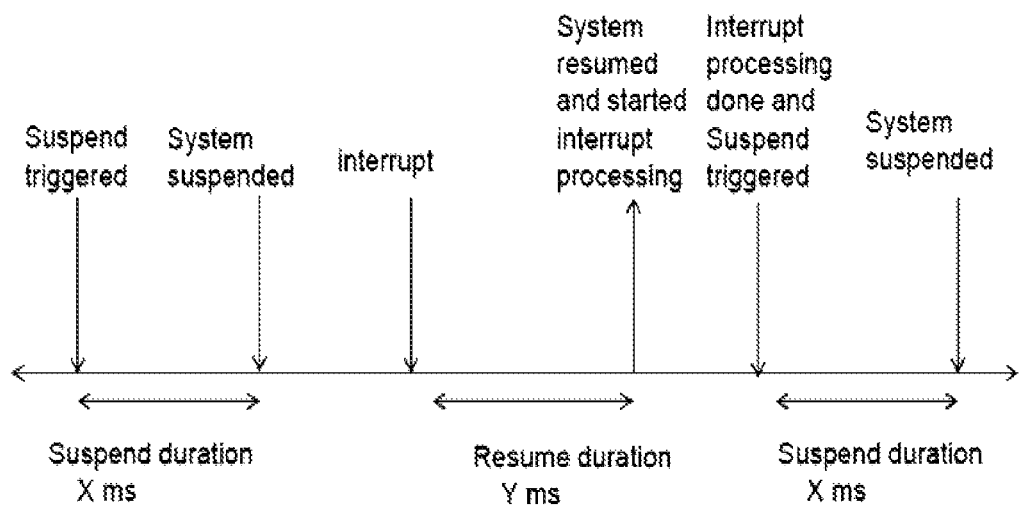
FIG. 7 is another diagram depicting timing aspects associated with the prior art.

Referring next to FIG. 3, shown is a flowchart depicting a method for resuming suspended resources on the computing device 100. As shown, in this method, each of a plurality of interrupt types is mapped to one or more related drivers 113 (Block 302), and the mapping is stored in the driver relationship datastore 122 (Block 304). In response to a particular interrupt being received from a hardware device 118 (Block 306), the suspend management component 114 accesses the stored mapping to identify one or more particular drivers 113 that are related to the particular interrupt (Block 308). The suspend management component 114 then prompts the suspend component 110 to only resume the one or more particular drivers 113 while maintaining other drivers 113 in a suspended state (Block 310). As shown in FIG. 4, both the resume duration (W ms) and the suspend duration (Z milliseconds) are shorter than the prior art approach of suspending the entire system as described with reference to time X milliseconds and Y milliseconds in FIG. 7. If another interrupt is issued (which falls outside the list of interrupts stored in the driver relationship datastore 122), then the entire system (e.g., user level 124, kernel level 108, and application processor 104) may be resumed.

In a variation of the method depicted in FIG. 3, each of the plurality of interrupt types is only mapped to a single parent-driver (that resides among the drivers 113), but each parent-driver is mapped to one or more dependent-drivers (that also reside among the drivers 113). In this variation, when a particular interrupt occurs, the corresponding parent-driver is resumed, and any dependent-drivers (corresponding to the parent-driver) are resumed when prompted by the parent-driver. Thus, suspend and resume latencies may be substantially reduced while also reduce power consumption.

Figure 5:
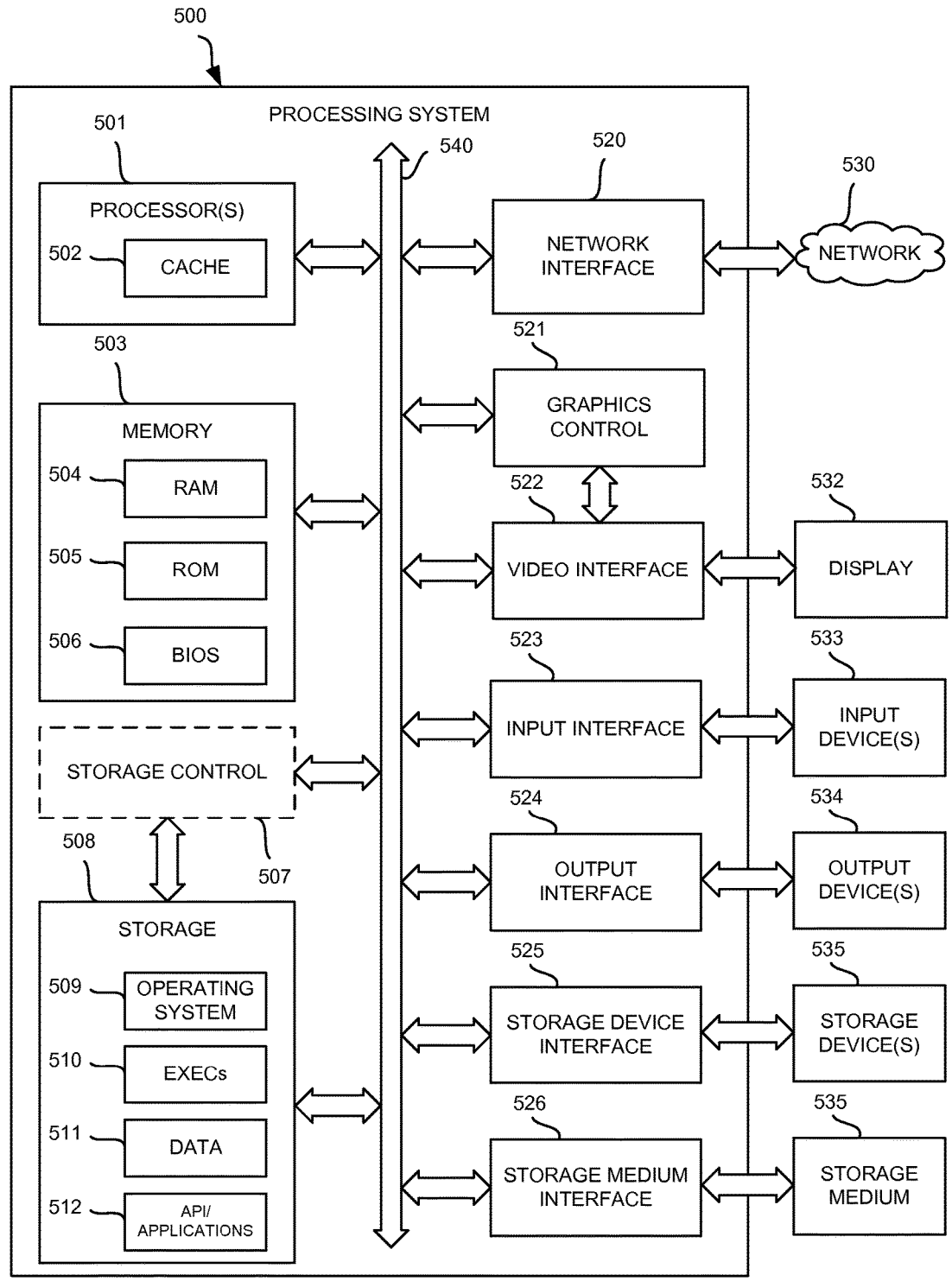
FIG. 5 is a schematic representation of physical components that may be utilized to realize the computing device depicted in FIG. 1.

The systems and methods described herein can be implemented in a machine such as a processing system in addition to the specific physical devices described herein. FIG. 5 shows a diagrammatic representation of one embodiment of a machine in the exemplary form of a computer system 500 within which a set of instructions can execute for causing a device to perform or execute any one or more of the aspects and/or methodologies of the present disclosure. The components in FIG. 5 are examples only and do not limit the scope of use or functionality of any hardware, software, embedded logic component, or a combination of two or more such components implementing particular embodiments.

Processing system 500 may include a processor 501, a memory 503, and a storage 508 that communicate with each other, and with other components, via a bus 540. The bus 540 may also link a display 532, one or more input devices 533 (which may, for example, include a keypad, a keyboard, a mouse, a stylus, etc.), one or more output devices 534, one or more storage devices 535, and various tangible storage media 536. All of these elements may interface directly or via one or more interfaces or adaptors to the bus 540. For instance, the various tangible storage media 536 can interface with the bus 540 via storage medium interface 526. Processing system 500 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 501 (or central processing unit(s) (CPU(s))) optionally contains a cache memory unit 502 for temporary local storage of instructions, data, or computer addresses. Processor(s) 501 are configured to assist in execution of processor-readable instructions. Processing system 500 may provide functionality as a result of the processor(s) 501 executing software embodied in one or more tangible processor-readable storage media, such as memory 503, storage 508, storage devices 535, and/or storage medium 536. The processor-readable media may store non-transitory instructions that implements particular embodiments, and processor(s) 501 may execute the instructions. For example, the suspend component 110, power management services 112, and suspend management component 114 may be realized by processors 501 executing non-transitory processor executable instructions. Memory 503 may read the instructions from one or more other non-transitory processor-readable media (such as mass storage device(s) 535, 536) or from one or more other sources through a suitable interface, such as network interface 520. The software may cause processor(s) 501 to carry out one or more processes or one or more steps of one or more processes described or illustrated herein. Carrying out such processes or steps may include defining data structures stored in memory 503 and modifying the data structures as directed by the software.

The memory 503 may include various components (e.g., machine readable media) including, but not limited to, a random access memory component (e.g., RAM 504) (e.g., a static RAM "SRAM", a dynamic RAM "DRAM, etc.), a read-only component (e.g., ROM 505), and any combinations thereof. ROM 505 may act to communicate data and instructions unidirectionally to processor(s) 501, and RAM 504 may act to communicate data and instructions bidirectionally with processor(s) 501. ROM 505 and RAM 504 may include any suitable tangible processor-readable media described below. In one example, a basic input/output system 506 (BIOS), including basic routines that help to transfer information between elements within processing system 500, such as during start-up, may be stored in the memory 503.

Fixed storage 508 is connected bidirectionally to processor(s) 501, optionally through storage control unit 507. Fixed storage 508 provides additional data storage capacity and may also include any suitable tangible processor-readable media described herein. Storage 508 may be used to store operating system 509, EXECs 510 (executables), data 511, APV applications 512 (application programs), and the like. Often, although not always, storage 508 is a secondary storage medium (such as a hard disk) that is slower than primary storage (e.g., memory 503). Storage 508 can also include an optical disk drive, a solid-state memory device (e.g., flash-based systems), or a combination of any of the above. Information in storage 508 may, in appropriate cases, be incorporated as virtual memory in memory 503.

Bus 540 connects a wide variety of subsystems. Herein, reference to a bus may encompass one or more digital signal lines serving a common function, where appropriate. Bus 540 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Processing system 500 may also include an input device 533. In one example, a user of processing system 500 may enter commands and/or other information into processing system 500 via input device(s) 533. Examples of an input device(s) 533 include, but are not limited to, a touch screen device, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 533 may be interfaced to bus 540 via any of a variety of input interfaces 523 (e.g., input interface 523) including, but not limited to, serial, parallel, game port, USB, FIREWIRE, THUNDERBOLT, or any combination of the above.

In particular embodiments, when computer system 500 is connected to network 530, computer system 500 may communicate with other devices, specifically mobile devices and enterprise systems, connected to network 530. Communications to and from computer system 500 may be sent through network interface 520. For example, network interface 520 may receive incoming communications (such as requests or responses from other devices) in the form of one or more packets (such as Internet Protocol (IP) packets) from network 530, and processing system 500 may store the incoming communications in memory 503 for processing. Processing system 500 may similarly store outgoing communications (such as requests or responses to other devices) in the form of one or more packets in memory 503 and communicated to network 530 from network interface 520. Processor(s) 501 may access these communication packets stored in memory 503 for processing.

Examples of the network interface 520 include, but are not limited to, a network interface card, a modem, and any combination thereof. Examples of a network 530 or network segment 530 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 530, may employ a wired and/or a wireless mode of communication. In general, any network topology may be used.

Information and data can be displayed through a display 532. Examples of a display 532 include, but are not limited to, a liquid crystal display (LCD), an organic liquid crystal display (OLED), a cathode ray tube (CRT), a plasma display, and any combinations thereof. The display 532 can interface to the processor(s) 501, memory 503, and fixed storage 508, as well as other devices, such as input device(s) 533, via the bus 540. The display 532 is linked to the bus 540 via a video interface 522, and transport of data between the display 532 and the bus 540 can be controlled via the graphics control 521.

In addition to a display 532, processing system 500 may include one or more other peripheral output devices 534 including, but not limited to, an audio speaker, a printer, and any combinations thereof. Such peripheral output devices may be connected to the bus 540 via an output interface 524. Examples of an output interface 624 include, but are not limited to, a serial port, a parallel connection, a USB port, a FIREWIRE port, a THUNDERBOLT port, and any combinations thereof.

In addition or as an alternative, processing system 500 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a processor-readable medium may encompass a circuit (such as an IC) storing software for execution, a circuit embodying logic for execution, or both, where appropriate. The present disclosure encompasses any suitable combination of hardware or software in connection with hardware.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software in connection with hardware, or combinations of both. The various illustrative components, blocks, modules, circuits, and steps have been described above generally in terms of their functionality. Whether such functionality is implemented as hardware or software in connection with hardware depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for managing power to components of a computing device, the method comprising:
scheduling, with a driver on the computing device, one or more activity times that indicate when the driver will be active;
storing the one or more activity times that indicate when the driver will be active;
receiving a request to suspend a system of the computing device;
retrieving the stored one or more activity times to identify when the driver will be active;
determining whether any of the one or more activity times is scheduled to occur within a suspend time window, wherein the suspend time window is a time it takes the system to be suspended once suspension of the system has been initiated;
initiating, if the driver will not be active during the suspend time window, suspension of the system;
mapping each of a plurality of interrupt types to related drivers;
storing the mapping on the computing device;
receiving a particular interrupt type;
accessing the stored mapping to identify particular drivers that are related to the interrupt type; and
resuming only the related drivers while maintaining other drivers suspended.

2. The method of claim 1, wherein the suspension of the system includes suspension of a user space, kernel, and kernel drivers.

3. The method of claim 1, including mapping each of a plurality of interrupts to a single one of the drivers;
storing the mapping on the computing device;
receiving a particular interrupt;
accessing the stored mapping to identify a single particular driver that is related to the interrupt;
resuming the single particular driver; and
prompting, with the single particular driver; resumption of other drivers that are related to the particular interrupt.

4. A computing device comprising:
a plurality of hardware components to perform functions on the computing device;
a plurality of drivers associated with the hardware components;
an interrupt scheduler to enable each of the drivers to schedule activity times that indicate when each of the drivers will be active;
a driver relationship datastore that includes a mapping of each of a plurality of interrupt types to related drivers;
a suspend component to suspend operation of the hardware components;
a suspend management component configured to:
obtain the activity times to identify when the drivers will be active;
determine whether any of the activity times is scheduled to occur within a suspend time window, wherein the suspend time window is a time it takes the operation of the hardware components to be suspended once suspension of the operation of the hardware components has been initiated;
initiate, if the drivers will not be active during the suspend time window, suspension of the hardware components;
access, in response to a particular interrupt type being received from one of the hardware components, the stored mapping to identify particular drivers that are related to the particular interrupt type; and
resume the related drivers while maintaining other drivers suspended.

5. The computing device of claim 4, including:
a driver relationship datastore that includes a mapping of each of a plurality of interrupts to a single one of the drivers;
wherein the suspend management component is configured to:
access the stored mapping to identify a single particular driver that is related to the interrupt; and
resume the single particular driver;
wherein the single particular driver prompts resumption of other drivers that are related to the particular interrupt.

6. A non-transitory, tangible processor-readable storage medium, encoded with processor readable instructions to perform a method for managing power to components of a computing device, the method comprising:
scheduling, with a driver on the computing device, one or more activity times that indicate when the driver will be active;
storing the one or more activity times that indicate when the driver will be active;
receiving a request to suspend a system of the computing device;
retrieving the stored one or more activity times to identify when the driver will be active;
determining whether any of the one or more activity times is scheduled to occur within a suspend time window, wherein the suspend time window is a time it takes the system to be suspended once suspension of the system has been initiated; and
initiating, if the driver will not be active during the suspend time window, suspension of the system;
mapping each of a plurality of interrupt types to related drivers;
storing the mapping on the computing device;
receiving a particular interrupt type;
accessing the stored mapping to identify particular drivers that are related to the interrupt type; and
resuming the related drivers while maintaining other drivers suspended.

7. The non-transitory, tangible processor-readable storage medium of claim 6, wherein suspension of the system includes suspension of a user space, kernel, and kernel drivers.

8. The non-transitory, tangible processor-readable storage medium of claim 6, the method including mapping each of a plurality of interrupts to a single one of the drivers;
storing the mapping on the computing device;
receiving a particular interrupt;
accessing the stored mapping to identify a single particular driver that is related to the interrupt;
resuming the single particular driver; and
prompting, with the single particular driver; resumption of other drivers that are related to the particular interrupt.

* * * * *